(12) United States Patent
Moriya et al.

(10) Patent No.: US 7,570,418 B2
(45) Date of Patent: Aug. 4, 2009

(54) METHOD OF DRIVING ELECTROPHORETIC DISPLAY DEVICE, AND ELECTROPHORETIC DISPLAY DEVICE

(75) Inventors: Soichi Moriya, Suwa (JP); Tsutomu Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/140,790

(22) Filed: Jun. 17, 2008

(65) Prior Publication Data

US 2008/0316581 A1    Dec. 25, 2008

(30) Foreign Application Priority Data

Jun. 22, 2007   (JP) ............................. 2007-164684
Mar. 11, 2008   (JP) ............................. 2008-060672

(51) Int. Cl.
    *G02B 26/00*   (2006.01)
(52) U.S. Cl. ....................... 359/296; 359/295
(58) Field of Classification Search .......... 359/295–298
    See application file for complete search history.

(56) References Cited

U.S. PATENT DOCUMENTS

2005/0012981 A1*  1/2005  Miura et al. ............... 359/296
2006/0187527 A1*  8/2006  Komatsu ................... 359/296
2008/0086378 A1*  4/2008  Reddy ....................... 705/14

FOREIGN PATENT DOCUMENTS

JP    2002-169190    6/2002
JP    2005-321732    11/2005

* cited by examiner

*Primary Examiner*—Jessica T Stultz
*Assistant Examiner*—Mahidere S Sahle
(74) *Attorney, Agent, or Firm*—AdvantEdge Law Group, LLC (57) ABSTRACT

An electrophoretic display device includes a transparent element substrate, a transparent opposite substrate, an electrophoretic display layer, and a selector. The element substrate has at least one transparent pixel electrode. The opposite substrate has a common electrode that is in correspondence with the at least one pixel electrode. The electrophoretic display layer is held between the element substrate and the opposite substrate. The selector selects any one of the element substrate and the opposite substrate as a display side of the electrophoretic display layer.

11 Claims, 9 Drawing Sheets

METHOD OF DRIVING ELECTROPHORETIC DISPLAY DEVICE, AND ELECTROPHORETIC DISPLAY DEVICE

BACKGROUND

1. Technical Field

The present invention relates to a method of driving an electrophoretic display device, and also to an electrophoretic display device.

2. Related Art

Recently, flexible non-luminous display devices have been used as flexible display devices, such as electronic papers. One of such non-luminous display devices includes an electrophoretic display device that uses an electrophoresis phenomenon. Here, the electrophoresis phenomenon is a phenomenon that, for example, when an electric field is applied, fine particles move on the basis of Coulomb force in a disperse system in which fine particles (electrophoretic particles) are dispersed in liquid (disperse medium).

Then, the flexible electrophoretic display device often employs flexible organic thin film transistors (organic TFTs) as thin film transistors. That is, the electrophoretic display device is formed of, for example, an active matrix circuit that uses organic TFTs for pixel transistors.

Then, there has been proposed a manner in which the electrophoretic display device is formed of an active matrix circuit, which is described in JP-A-2002-169190. JP-A-2002-169190 describes that, in an electrophoretic display panel that includes a disperse system, in which electrophoretic particles are dispersed, between an element substrate and an opposite substrate, pixel electrodes, scanning lines, data lines and pixel TFTs are formed on the element substrate, and a common electrode is formed on the opposite substrate. In addition, in a process that is common to a process in which the pixel TFTs are formed on the element substrate, TFTs that constitute a scanning line driving circuit and a data line driving circuit are also formed. Thus, the low-cost active matrix electrophoretic display device is manufactured.

However, in the case of a sheet of paper, both the front and rear faces of the sheet of paper is usable; however, in the case of an electrophoretic display device, it has been usual that only the front face is used for display. Then, there has been proposed an electrophoretic display device that displays an image, or the like, on both the front and rear faces, which is described in JP-A-2005-321732. JP-A-2005-321732 describes that, on the front face of the display device, a first display portion having electrically charged particles is provided between a common substrate that has a common driving electrode layer and a first display substrate that has a first opposite electrode layer, which is a ground side electrode. In addition, on the back face of the image display device, a second display portion having electrically charged particles is provided between the common substrate that is shared with the front face and a second display substrate having a second opposite electrode layer, which is a ground side electrode. Then, by electrically switching between the first and second opposite electrode layers, an electric field is generated only on any one of the first and second display portions. Thus, individual images, or the like, are displayed respectively on the first and second display portions, so that it has been possible to display an image, or the like, on each of the front and rear faces of the electrophoretic display device.

JP-A-2005-321732 achieves front and rear double-side display by sharing the common driving electrode layer between the first and second display portions; however, the opposite electrode and the electrophoretic display layer need to be provided for each of the display portions and, therefore, it has been difficult to form a thin electrophoretic display device and/or to reduce manufacturing costs.

SUMMARY

An advantage of some aspects of the invention is that it provides a method of driving a thin and low-cost electrophoretic display device that is able to display an image, or the like, on each of the front and rear faces and also provides an electrophoretic display device. In addition, another advantage of some aspects of the invention is that it provides a thin electrophoretic display device that is able to perform front and rear double-side display.

An aspect of the invention provides an electrophoretic display device. The electrophoretic display device includes a transparent element substrate, a transparent opposite substrate, an electrophoretic display layer, and a selector. The element substrate has at least one transparent pixel electrode. The opposite substrate has a common electrode that is in correspondence with the at least one pixel electrode. The electrophoretic display layer is held between the element substrate and the opposite substrate. The selector selects any one of the element substrate and the opposite substrate as a display side of the electrophoretic display layer.

Because the at least one pixel electrode, the element substrate, the common electrode and the opposite substrate all are transparent, it is possible to perform display using a single electrophoretic display layer even in each case where the selector selects the element substrate as a display side or where the selector selects the opposite substrate as a display side.

In the electrophoretic display device according to the aspect of the invention, a sensor may be provided to detect an upward facing surface of the electrophoretic display device, wherein the selector may select the upward facing surface as the display side on the basis of a signal from the sensor. According to the above configuration, when the electrophoretic display device is used on a desk, or the like, the electrophoretic display device is able to automatically recognize whether the display side is the element substrate or the opposite substrate.

In addition, in the electrophoretic display device according to the aspect of the invention, a switch may be provided to specify a side on which the electrophoretic display device displays, wherein the selector may select the display side on the basis of a signal from the switch. According to the above configuration, when the electrophoretic display device is used other than on a desk, or the like, the electrophoretic display device may set the display side to a side that corresponds to user's request.

In addition, in the electrophoretic display device according to the aspect of the invention, the display side may be configured so that the opposite substrate is selected as an initial display side.

If the display side differs from a desired one, there is a possibility that the display data need to be converted to the data suitable for the display side; however, by specifying the initial display side, it is possible to set reference display data. In the electrophoretic display device, the side on which the opposite electrode is present is usually set as a display side, so that it is easy to import data to the electrophoretic display device according to the aspect of the invention.

In addition, in the electrophoretic display device according to the aspect of the invention, the electrophoretic display device may hold a plurality of sequenced pieces of display data, wherein, when the display side is switched by the selector in such a manner that a surface of the element substrate is rotated in a clockwise direction about a rotation axis that is parallel to the surface of the element substrate, display data next in sequence to the display data that have been displayed before the display side is switched may be displayed, and wherein, when the display side is switched by the selector in such a manner that the surface of the element substrate is rotated in a counterclockwise direction about a rotation axis that is parallel to the surface of the element substrate, display data preceding in sequence to the display data that have been displayed before the display side is switched may be displayed.

Another aspect of the invention provides a method of driving an electrophoretic display device that includes a transparent element substrate having at least one transparent pixel electrode, a transparent opposite substrate having a transparent common electrode that is in correspondence with the at least one pixel electrode, an electrophoretic display layer that is held between the element substrate and the opposite substrate, and a selector that selects any one of the element substrate and the opposite substrate as a display side of the electrophoretic display layer. The method of driving the electrophoretic display device includes driving display data for the electrophoretic display layer so as to obtain a display suitable for the display side that is selected by the selector.

In one method in the method of driving the electrophoretic display device according to the aspect of the invention, first display data to be displayed on the opposite substrate may be held in advance, wherein, when the opposite substrate is selected as the display side, the first display data may be set as the display data, and wherein, when the element substrate is selected as the display side, the first display data may be converted to second display data to be displayed on the element substrate and then the second display data may be set as the display data.

According to the above configuration, it is easy to import data that are used in another electrophoretic display device. In addition, in another method in the method of driving the electrophoretic display device according to the aspect of the invention, third display data used when the opposite substrate is set as the display side and fourth display data used when the element substrate is set as the display side may be provided in advance, wherein any one of the third display data and the fourth display data, which are in correspondence with the display side selected by the selector, may be selected and set as the display data.

In addition, in another method in the method of driving the electrophoretic display device according to the aspect of the invention, the display data that are held in advance may be fifth display data to be displayed on any one of the opposite substrate and the element substrate, wherein the fifth display data may include a tag that indicates whether the fifth display data use the opposite substrate or the element substrate as a display side, wherein, when the display side selected by the selector is a display side indicated by the tag, the fifth display data may be set as the display data, and wherein, when the display side selected by the selector is not a display side indicated by the tag, the fifth display data may be converted to sixth display data to be displayed on the display side and then the sixth display data may be set as the display data.

Alternatively, in the method of driving the electrophoretic display device according to the aspect of the invention, the same data may be used as the display data between when the opposite substrate is set as a display side and when the element substrate is set as a display side, wherein a sequence, in which the pixel electrodes are driven, may be changed depending on the display side selected by the selector.

According to the above configuration, it is possible to eliminate the need for data conversion. In the method of driving the electrophoretic display device according to the aspect of the invention, a plurality of sequenced pieces of the display data may be held, wherein, when the display side is switched by the selector in such a manner that a surface of the element substrate is rotated in a clockwise direction about a rotation axis that is parallel to the surface of the element substrate, display data next in sequence to the display data that have been displayed before the display side is switched may be driven, and wherein, when the display side is switched by the selector in such a manner that the surface of the element substrate is rotated in a counterclockwise direction about a rotation axis that is parallel to the surface of the element substrate, display data preceding in sequence to the display data that have been displayed before the display side is switched may be driven.

According to the electrophoretic display device and the method of driving the electrophoretic display device of the aspect of the invention, it is possible to provide an electrophoretic display device that is able to display an image, or the like, on both the front and rear faces of the thin and low-cost electrophoretic display device.

The electrophoretic display device and the method of driving the electrophoretic display device may be configured so that the display data are changed to other display data when it is determined that the display side is switched on the basis of a signal detected by the sensor.

According to the electrophoretic display device and the method of driving the electrophoretic display device, the display data are changed when the "display side" is switched. Thus, because an image displayed on the "display side" is changed in accordance with switching of the "display side" of the electrophoretic display device, which is determined by the sensor, it is possible to change an image of the electrophoretic display device by an operation like turning the paper. As a result, it is possible to increase applications, such as an electronic paper, an electronic book, or the like, of the electrophoretic display device.

In the electrophoretic display device according to the aspect of the invention, the display data, when the display side is not on the substrate side that is determined in advance, may be converted to display data for which right to left and color are inverted for the display side.

According to the above electrophoretic display device, the display data, when the "display side" is not on the substrate side that is determined in advance, may be converted to display data for which right to left and color of the display data are inverted. Thus, even on a substrate side that is not the predetermined substrate side and on which an appropriate image is not displayed with the original display data, it is possible to display an appropriate image using the converted display data. As a result, it is possible to increase applications, such as an electronic paper, an electronic book, or the like, of the electrophoretic display device.

In the electrophoretic display device according to the aspect of the invention, the light transmittance ratio of the element substrate may be the same as the light transmittance ratio of the opposite substrate. According to the above electrophoretic display device, because the light transmittance ratio of the element substrate is the same as the light transmittance ratio of the opposite substrate, even when any one of the substrate sides is determined to be the "display side" and an image is then displayed, the image is displayed under the condition of the same light transmittance ratio. That is, it is possible to reduce a difference in image, such as a difference in light and dark, for example, depending on whether an image is displayed on the element substrate side or on the opposite substrate side.

The sensor used for the electrophoretic display device according to the aspect of the invention may be, for example, an acceleration sensor. Whether the rotated direction of the electrophoretic display device is in a "clockwise direction" or in a "counterclockwise direction", or the upper side, or the like, may be easily detected by the acceleration sensor and then determined by the control device. As a result, it is possible to easily specify the "display side" of the electrophoretic display device. In addition, it is possible to support various patterns of rotation of the electrophoretic display device.

BRIEF DESCRIPTION OF THE DRAWINGS

The invention will be described with reference to the accompanying drawings, wherein like numbers reference like elements.

FIG. 8A and FIG. 8B are side views that illustrate detection of inclination angle by the acceleration sensor according to the embodiment, in which

FIG. 10A and FIG. 10B are plan views, each of which shows an image displayed on the electrophoretic display device according to the embodiment, in which

FIG. 11A and FIG. 11B are plan views, each of which shows an image displayed on the electrophoretic display device according to the embodiment, in which

DESCRIPTION OF EXEMPLARY EMBODIMENTS

Figure 1:
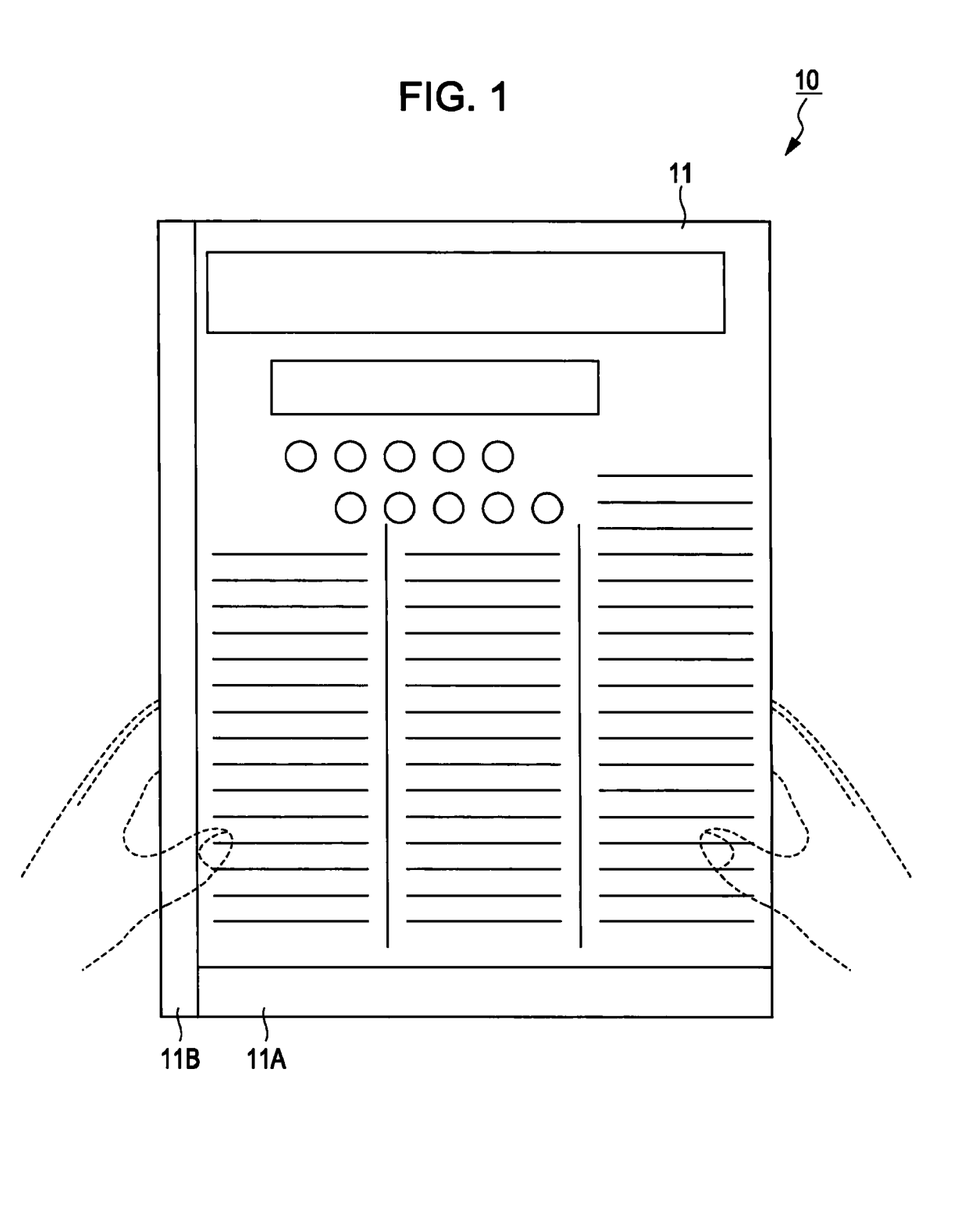
FIG. 1 is an overall plan view of an embodiment of an electrophoretic display device, which is provided with electrophoretic particles, according to the invention.
Figure 2:
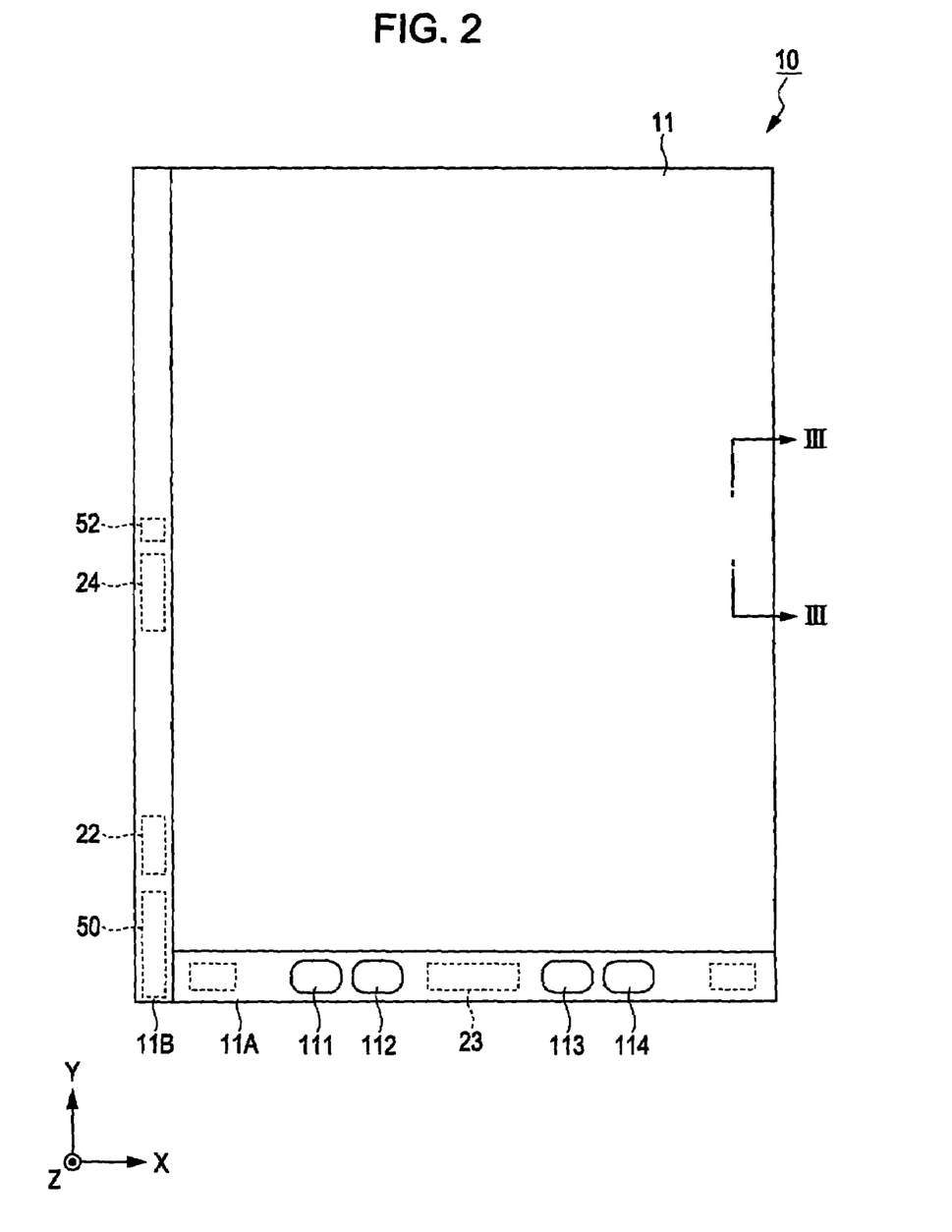
FIG. 2 is a plan view that shows the planar structure of the electrophoretic display device according to the embodiment.

Hereinafter, an embodiment of a method of driving an electrophoretic display device and an electrophoretic display device according to the invention will be described with reference to the accompanying drawings. FIG. 1 and FIG. 2 are views, each of which shows the overall plan view of an electrophoretic display device (display device) 10.

As shown in FIG. 1 and FIG. 2, the display device 10 includes an electrophoretic display panel (display panel) 11, and has a first frame portion 11A to the lower side of the display panel 11 and a second frame portion 11B to the left side of the display panel 11.

As shown in FIG. 2, four operating buttons 111 to 114 are provided on the first frame portion 11A. Each of the operating buttons 111 to 114 is, for example, formed of a membrane switch, a sheet-like key switch, a pressure sensor, or the like, which is thin and flexible, and is able to respond to a manipulation from any of the front and rear sides of the display panel 11. In addition, the second frame portion 11B is provided with a storage battery (not shown), which serves as a driving power source, of the display device 10, an externally-connected terminal (not shown), and the like.

Figure 3:
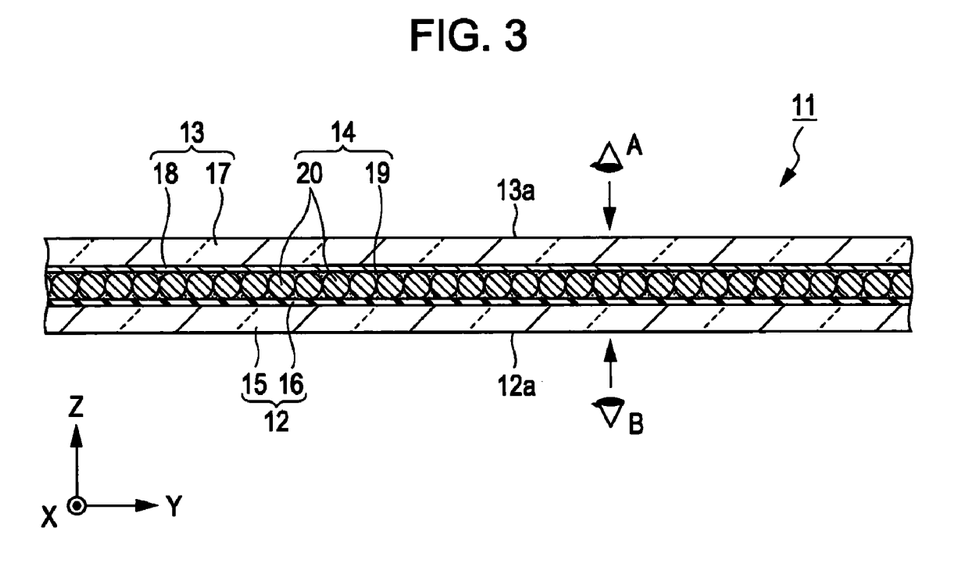
FIG. 3 is a cross-sectional view that is taken along the line III-III in FIG. 2, showing the cross section structure of a display panel according to the embodiment.

FIG. 3 is a cross-sectional view that is taken along the like III-III of the display panel 11. In FIG. 3, the display panel 11 includes an element substrate 12 and an opposite substrate 13, and an electrophoretic display layer 14 is arranged between the element substrate 12 and the opposite substrate 13. In addition, a front face 13a is provided on the surface (upper side in FIG. 3) of the opposite substrate 13, and a back face 12a is provided on the surface (lower side in FIG. 3) of the element substrate 12. That is, the electrophoretic display layer 14 is viewed through the opposite substrate 13 in an A direction (front face 13a side) and is viewed through the element substrate 12 in a B direction (back face 12a side).

As shown in FIG. 3, the element substrate 12 is provided with a back face substrate 15 that is flexible and optically transparent, and an element forming layer 16 is formed on one face thereof (upper side in FIG. 3). The back face substrate 15 is formed of a thermoplastic resin or thermosetting resin material that has high flexibility, optical transparency, elasticity, and the like, such as polyethylene terephthalate, polycarbonate, polyimide, polyethylene, or the like, for example. In addition, a plurality of conductive layers and insulating layers are formed on the element forming layer 16 and, for example, organic transistors Tr (see FIG. 4), pixel electrodes and various wirings are formed on the element forming layer 16. The conductive layer, particularly, the pixel electrodes, is formed of an optically transparent conductive material, such as indium tin oxide, or the like, or an electronically conductive macromolecule, or the like, such as polyaniline, for example. In addition, the insulating layer is also formed of a material that is optically transparent. Furthermore, wirings, or the like, that are formed of a material that is not optically transparent are formed to have a thickness of several µm (micrometers) or have a thickness of 10 nm (nanometers), so that a reduction in light transmittance ratio is suppressed.

Note that, in the present embodiment, a p-channel organic transistor Tr will be described; however, the configuration of the organic transistor may be an n-channel organic transistor or an organic transistor of another type.

Figure 4:
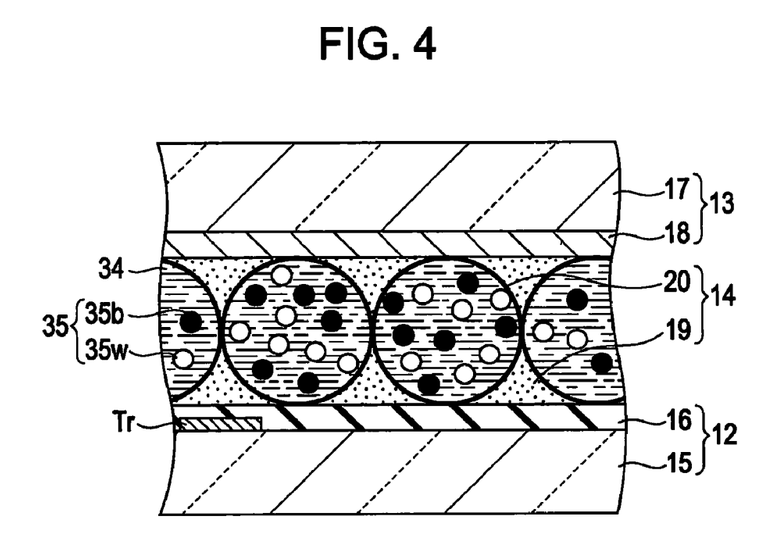
FIG. 4 is a cross-sectional view that shows the cross section structure of the display panel according to the embodiment.

The organic transistors Tr, as shown in FIG. 4, are formed as field-effect transistors in such a manner that an insulating layer, electrodes, and an organic semiconductor layer, which form the element forming layer 16, are laminated on the upper face of a back face substrate 15 in a predetermined order. When each of the electrodes is formed of a conductive material having a low transparency, that is, for example, a metal, such as gold, copper, or aluminum, each electrode desirably has a thickness of 100 nm or below. If each electrode has a thickness of 100 nm or above, the transmittance ratio of visible light decreases and, therefore, the display characteristic on one side deteriorates. In addition, in regard to an electronically conductive polymer, or the like, such as polyaniline as well, similarly, it desirably has a thickness of 10 μm or below. If the electronically conductive polymer is 10 μm or above, the transmittance ratio of visible light decreases and, therefore, the display characteristic on one side deteriorates. In addition, a transparent oxide, such as indium tin oxide or indium zinc oxide, is preferable because the transmittance ratios of them are high. On the other hand, the insulating layer is, for example, formed of an insulating material, that is, formed of a material of one or combination of epoxy resin, ester resin, polyparaxylene, the derivative of polyparaxylene, polyvinylphenol, acrylic resin, which is represented by polymethylmethacrylate, polyimide, polystyrene, polyvinylalcohol, polyvinylacetate, or the like. Among these materials, the materials desirably do not have absorption wave in a visible light range, or the materials desirably have a large transmission coefficient. In addition, the organic semiconductor layer may be, for example, formed of one or combination of naphthalene, anthracene, tetracene, pentacene, hexacene, phthalocyanine, perylene, hydrazone, triphenylmethane, diphenylmethane, stilbene, arylvinyl, pyrazoline, triphenylamine, triarylamine, oligothiophene, or a low-molecular organic semiconductor material like a derivative of one of them, poly-N-vinylcarbazole, polyvinylpyrene, polyvinylanthracene, polythiophene, polyhexylthiophene, poly(p-phenylenevinylene), polythinylenevinylene, polyarylamine, pyreneformaldehyde resin, ethylcarbazoleformaldehyde resin, fluorenebithiophene copolymer, fluorene-arylamine copolymer, or a high-molecular organic semiconductor material like a derivative of one of them. Furthermore, the materials desirably do not have absorption wave in a visible light range, or the materials desirably have a large transmission coefficient.

That is, the element substrate 12 is formed to have a predetermined light transmittance ratio, for example, in such a manner that regions corresponding to pixel electrodes each have a predetermined aperture ratio, or the like. The opposite substrate 13 includes a transparent substrate 17 that is flexible and optically transparent. A common electrode 18 is formed on one face (lower side in FIG. 3) of the opposite substrate 13. The transparent substrate 17 is formed of a thermoplastic resin or thermosetting resin material that has high flexibility, optical transparency, elasticity, and the like, such as polyethylene terephthalate, polycarbonate, polyimide, polyethylene, or the like, for example. The common electrode 18 is formed of the same material as that of the above described electrodes.

Then, in the present embodiment, the transparent substrate 17 is formed of the same material and formed to have the same thickness as the back face substrate 15, and the common electrode 18 is formed to have the same thickness as the element forming layer 16, and is formed so that the light transmittance ratio of the element substrate 12 is close to the light transmittance ratio of the opposite substrate 13. Alternatively, the thickness of the substrate and/or the thickness of the interlayer insulating layer is adjusted to be formed so that the light transmittance ratios of both faces in a visible light range are equal.

Figure 6:
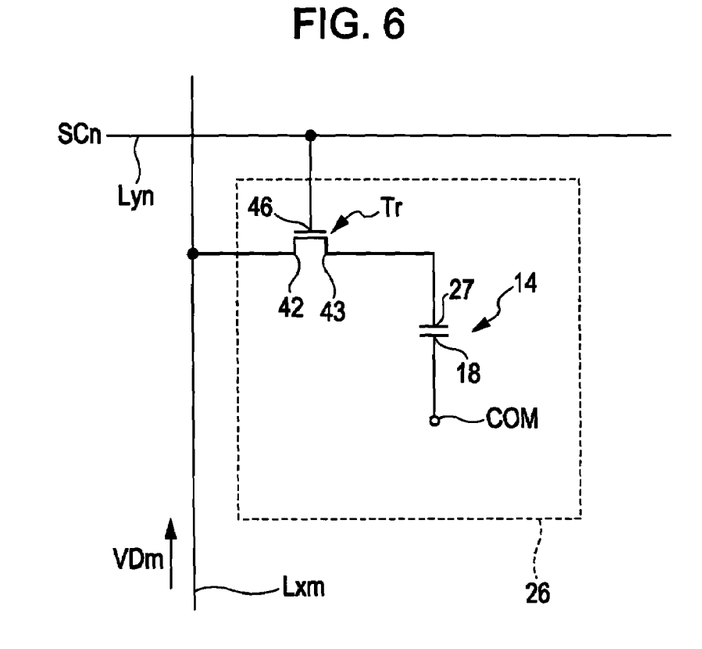
FIG. 6 is a circuit diagram that shows an equivalent circuit of a pixel portion according to the embodiment.

Note that a light shielding black matrix that covers the organic transistors may be formed in the insulating layer of the element forming layer 16. Specifically, a grid-like black matrix (not shown) having openings at the pixel electrodes 26 shown in FIG. 6 is formed over all the pixels (display area), and the organic transistors Tr are arranged so as to overlap the black matrix in plan view. For example, the organic transistors Tr each are arranged to the outer side of the corresponding pixel electrode adjacent to the intersection of a data line Lxm and a scanning line Lyn.

According to the above configuration, it is possible to prevent light that enters from the side of the back face substrate 15 from being irradiated to the organic transistors Tr. Thus, it is possible to stabilize the operation of the transistors Tr. In addition, a black matrix may also be formed on the transparent substrate 17. Because the above described black matrix is formed so as to surround each pixel (electrode), it functions to sharpen the grayscale of each pixel. Thus, it is possible to increase the contrast. Furthermore, it is possible to uniform the display quality on both the front face side and the back face side.

The electrophoretic display layer 14 is formed of a large number of microcapsules 20 that are integrated by a binder 19. Each of the microcapsules 20, as shown in FIG. 4, encapsulates an electrophoretic dispersion medium 34, which serves as a disperse system, and electrophoretic particles 35. The electrophoretic particles 35 include white color particles 35w that are positively or negatively charged and black color particles 35b that are charged with polarity that is different from that of the white color particles 35w. The white color particles 35w and the black color particles 35b each move in the electrophoretic dispersion medium 34 in accordance with the direction of an electric field applied to each microcapsule 20.

Each microcapsule 20 is, for example, formed of gum arabic-gelatin compound, urethane compound, and the like. The electrophoretic dispersion medium 34 is, for example, formed of water, methanol, ethanol, or the like. In addition, the electrophoretic particles 35 are, for example, formed of aniline black, carbon black, titanium dioxide, or the like.

That is, in the present embodiment, an image, or the like, that is displayed on the electrophoretic display layer 14 by the electrophoretic particles 35 will be displayed under the same light transmittance ratio through the opposite substrate 13 in the A direction and through the element substrate 12 in the B direction.

On the other hand, in the element substrate 12, as shown in FIG. 2, a scanning line driving circuit 23 is provided at a position corresponding to the first frame portion 11A, and a display control circuit 22, a data line driving circuit 24, a control device 50 and an acceleration sensor 52 are provided at a position corresponding to the second frame portion 11B.

Figure 5:
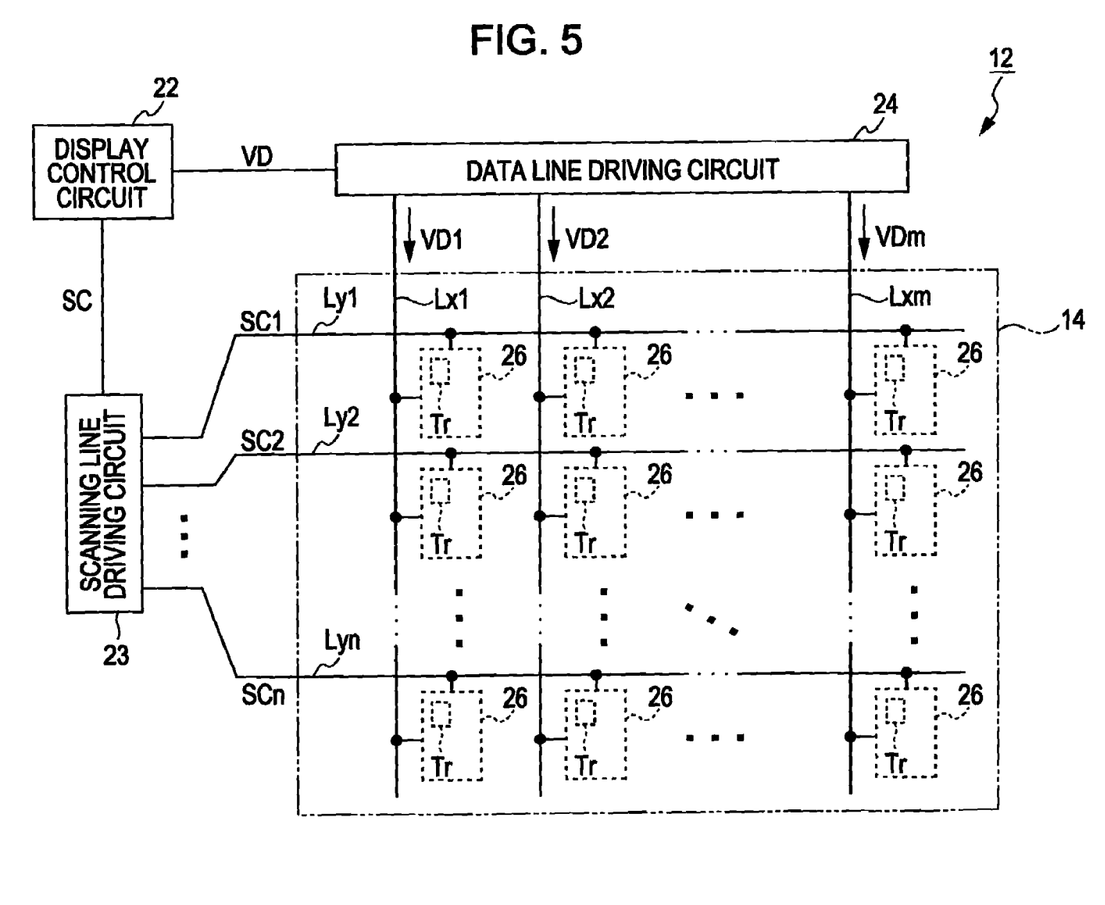
FIG. 5 is a circuit diagram that shows the circuitry of an element substrate according to the embodiment.

FIG. 5 is a view that illustrates a circuitry in a state where the display device 10 shown in FIG. 2 is rotated by 90 degrees in a clockwise direction, that is, in a state where the second frame portion 11B is directed to the upper side. The element substrate 12, as shown in FIG. 5, is formed so that n scanning lines Ly1, Ly2, . . . , Lyn (n is natural number) are formed so as to extend over substantially the entire width in a horizontal direction (longitudinal direction in FIG. 2), and m data lines Lx1, Lx2, . . . , Lxm (m is natural number) are formed so as to extend over substantially the entire width in a vertical direction (lateral direction in FIG. 2).

The pixels 26 that are connected to the corresponding scanning lines Ly1 to Lyn and the corresponding data lines Lx1 to Lxm are arranged at positions corresponding to the intersections of the scanning lines Ly1 to Lyn and the data lines Lx1 to Lxm. That is, the plurality of pixels 26 are arranged on the element substrate 12 in a matrix. Then, each of the pixels 26 includes a control element, such as the organic transistor Tr, and an optically transparent pixel electrode 27 (see FIG. 6) that is formed of a transparent conductive film, or the like.

FIG. 6 is an equivalent circuit of the pixel 26 that is formed at a portion corresponding to the intersection of the m-th data line Lxm and the n-th scanning line Lyn. The pixel 26 includes the organic transistor Tr, the electrophoretic display layer 14 that has a size corresponding to the pixel electrode 27, and the common electrode 18.

The gate electrode 46 of the organic transistor Tr is connected to the n-th scanning line Lyn, and the source electrode 42 thereof is connected to the m-th data line Lxm. In addition, the drain electrode 43 of the organic transistor Tr is connected to the pixel electrode 27. Then, the common electrode 18 is formed at a position that faces the pixel electrode 27 through the electrophoretic display layer 14. The common electrode 18 is connected to a common terminal COM.

Figure 7:
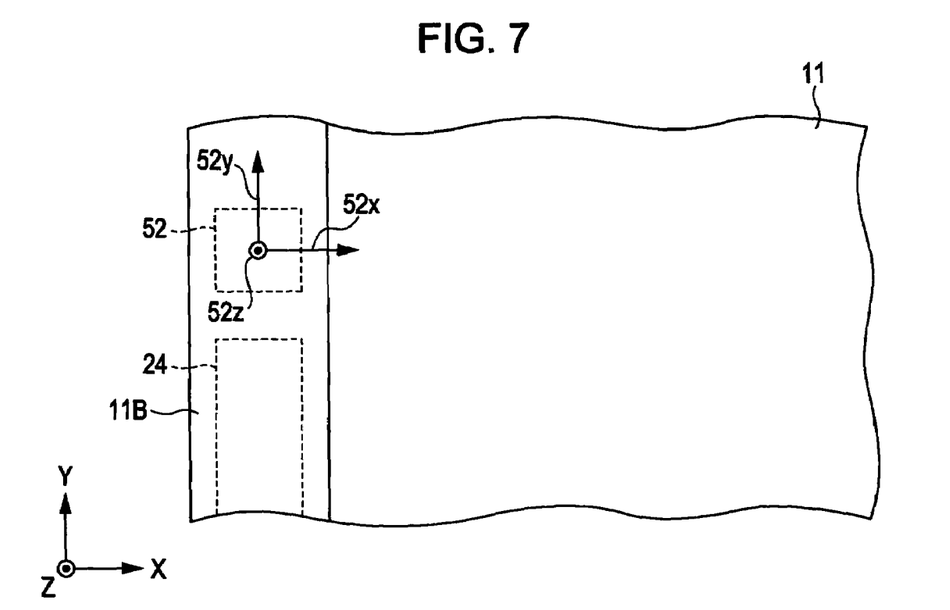
FIG. 7 is a plan view that shows the arrangement of an acceleration sensor according to the embodiment.

As shown in FIG. 7, an acceleration sensor 52 is internally provided in the second frame portion 11B of the display panel 11. The acceleration sensor 52 has an X-direction detection axis 52x of which the direction coincides with the X direction of the display panel 11, a Y-direction detection axis 52y of which the direction coincides with the Y direction of the display panel 11, and a Z-direction detection axis 52z of which the direction coincides with the Z direction of the display panel 11.

Figure 8A:
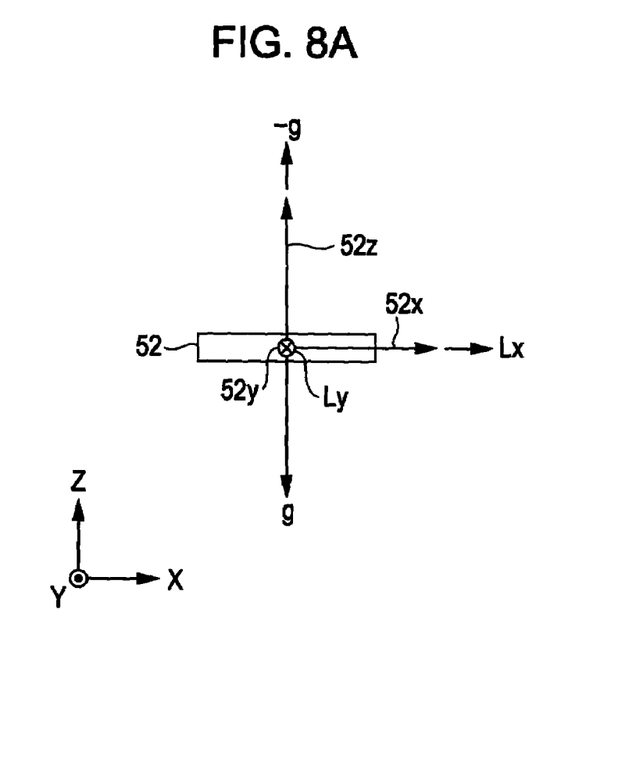
FIG. 8A is a side view that shows a horizontal state and FIG. 8B is a side view that shows an inclined state.
Figure 8B:
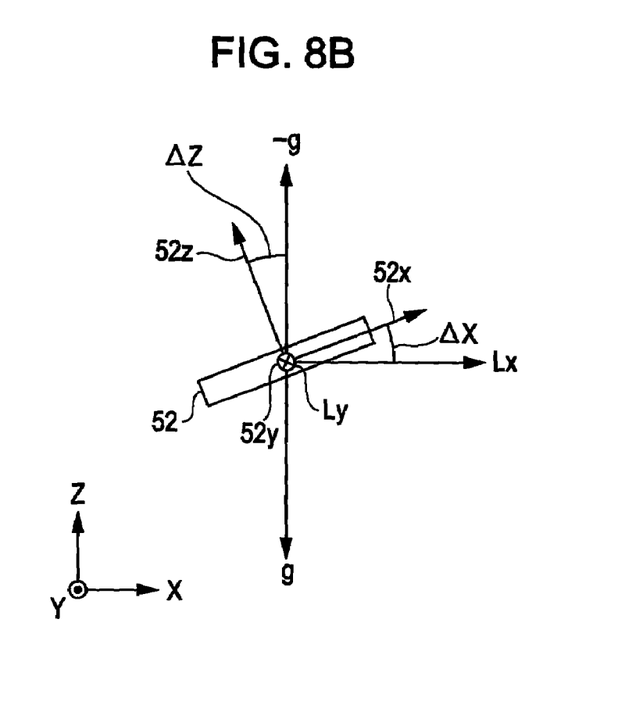

More specifically, as shown in FIG. 8A and FIG. 8B, the X-direction detection axis 52x is an axis by which an inclination angle ΔX is detected with respect to a horizontal line Lx. The Y-direction detection axis 52y is an axis by which an inclination angle ΔY is detected with respect to a horizontal line Ly. The Z-direction detection axis 52z is an axis by which an inclination angle ΔZ is detected with respect to an anti-gravitational direction −g.

The inclination angle ΔX is configured to be detected as "0 degrees" when the X-direction detection axis 52x is parallel to the horizontal line Lx, "−90 degrees" when the X-direction detection axis 52x coincides with the gravitational direction g, or "90 degrees" when the X-direction detection axis 52x coincides with the antigravitational direction −g.

In addition, the inclination angle ΔY is configured to be detected as "0 degrees" when the Y-direction detection axis 52y is parallel to the horizontal line Ly, "−90 degrees" when the Y-direction detection axis 52y coincides with the gravitational direction g, or "90 degrees" when the Y-direction detection axis 52y coincides with the antigravitational direction −g.

Furthermore, the inclination angle ΔZ is configured to be detected as "0 degrees" when the Z-direction detection axis 52z coincides with the antigravitational direction −g, "90 degrees" when the Z-direction detection axis 52z is horizontal, or "180 degrees" when the Z-direction detection axis 52z coincides with the gravitational direction g.

Figure 9:
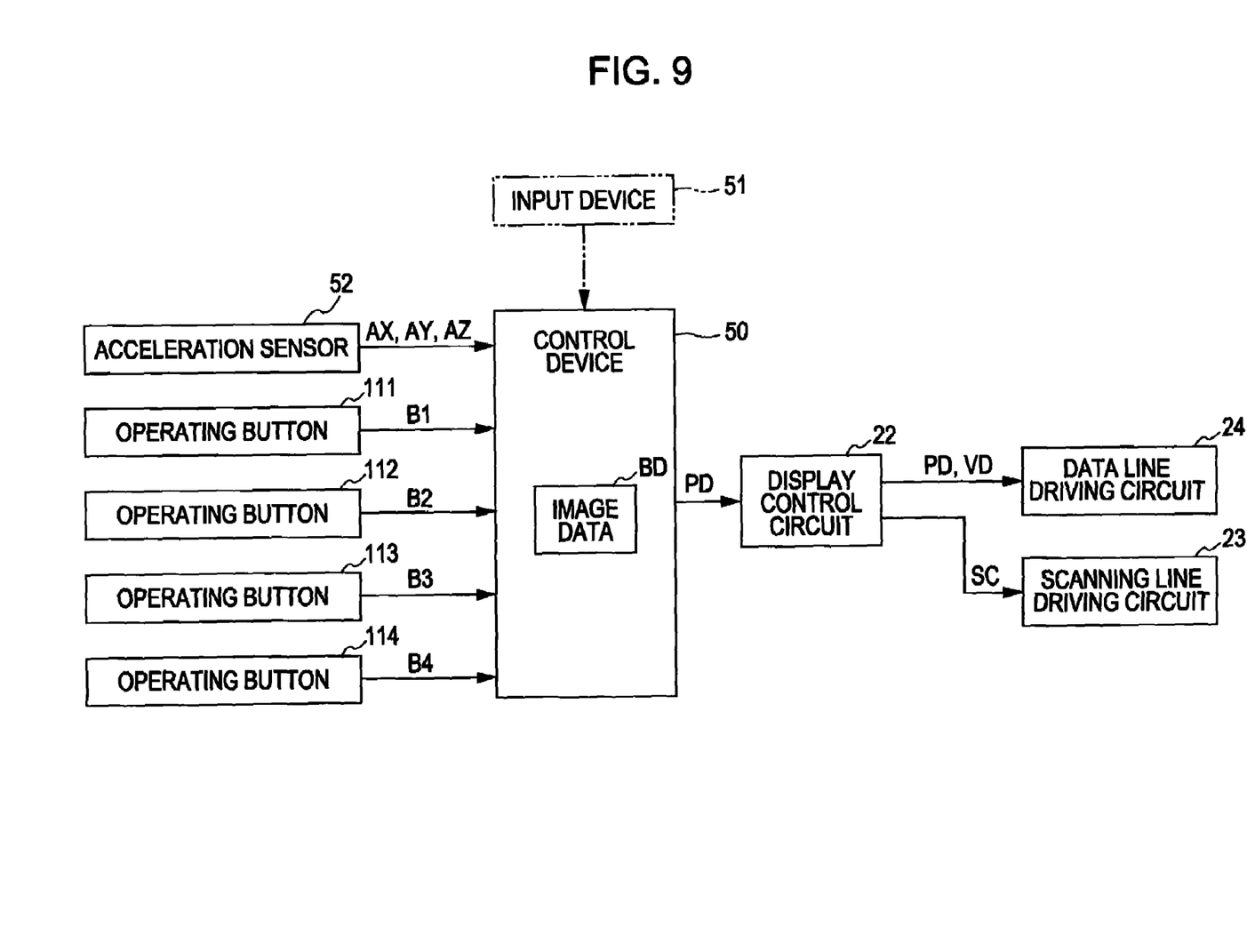
FIG. 9 is a block diagram that shows the electrical configuration of the electrophoretic display device according to the embodiment.

Next, the electrical configuration of the electrophoretic display device 10 as constructed above will be described with reference to FIG. 9. In FIG. 9, the control device 50, which serves as a selector, includes a CPU, a ROM, a RAM, and the like. Then, the control device 50 is configured to control display operation of the display panel 11 through the display control circuit 22 in accordance with various data and various programs stored in the ROM, the RAM, or the like.

An input device 51, the acceleration sensor 52, the operating buttons 111 to 114, which serve as switches, and the display control circuit 22 are connected to the control device 50. The input device 51 is electrically connected to the control device 50 through an external connecting terminal. The input device 51 is detachably connected to the control device 50 (display device 10) and is electrically connected thereto as needed. The input device 51 inputs image data BD, various programs, or the like, to the control device 50, supplies a storage battery with electric power for charging the storage battery. The image data BD, for example, correspond to data of the entire contents of a book, and images corresponding to display contents of whole pages of the book are generated together with information of a break of each page.

The control device 50 is configured to store the input image data BD in the RAM. In addition, the control device 50 selects a predetermined page to be displayed on the display panel 11, generates display data PD that are separated on the basis of the page break information and that constitute first display data of one page from the image data BD, and then inputs the display data PD to the display control circuit 22. Note that, in the present embodiment, the front face 13a of the display device 10 is set as a reference display side (initial display side), and the display data PD are data that are generated so as to display characters, or the like, on the front face 13a, which serves as the initial display side.

Figure 10A:
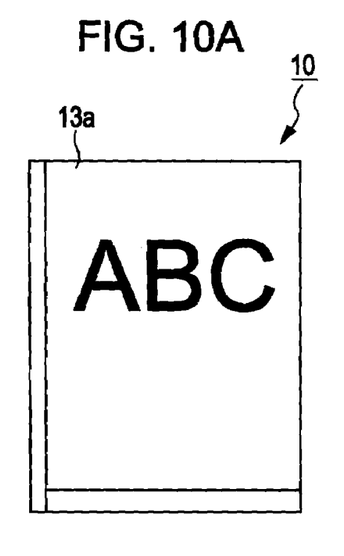
FIG. 10A is a plan view that shows an image displayed on a display side and FIG. 10B is a plan view that shows an image displayed on the opposite side of the display side.

For example, on the basis of the display data PD, as shown in FIG. 10A, characters (image) of one page "ABC" are displayed on the side of the front face 13a of the display device 10. At this time, the element substrate 12 is transparent, so that inverted characters (inverted image) that are obtained by inverting the characters (image) "ABC" are displayed on the back face 12a as well. In other words, the positive image of "ABC" is displayed on the side of the front face 13a, and the inverted negative image of "ABC" is displayed on the side of the back face 12a.

Note that the display device 10 is a reflective display device, so that, when viewed from the side of the front face 13a, the display of the side of the back face 12a does not appear. In addition, this also applies to the case when viewed from the side of the back face 12a. In order to obtain the above situation, the electrophoretic dispersion medium 34 described in FIG. 4 is an intermediate color between white and black (for example, gray), and is desirably semi-translucent. According to the above configuration, for example, it is possible to reduce the influence of light entering from the back face 12a when viewed from the side of the front face 13a. In addition, it is possible to perform grayshade. Specifically, for example, when viewed from the side of the front face 13a, it appears "white" when white particles are adhered to the common electrode 18, it appears "light gray" because light that is transmitted through the electrophoretic dispersion medium 34 and is reflected by the white particles gradually attenuates as the white particles leave from the common electrode, and it appears "gray" that is a color tone of the disperse medium as the white particles come to the middle in the thickness of the electrophoretic display layer. In addition, it appears "dark gray" as the white particles further sink, that is, as the white particles approach the side of the element substrate 12. Note that, at this time, black particles approach the side of the common electrode 18 in place of the white particles, and, when the white particles completely sink and are adhered to the element forming layer 16, it appears "black" on the side of the front face 13a because the black particles are adhered to the common electrode 18.

In this manner, according to the electrophoretic display device 10 of the aspects of the invention, by controlling a difference in electric potential applied between the common electrode 18 and the element forming layer 16 (pixel electrodes 26), it is possible to adjust the positions of white particles and black particles in the thickness direction of the electrophoretic display layer, and thereby it is possible to perform grayshade.

Figure 10B:
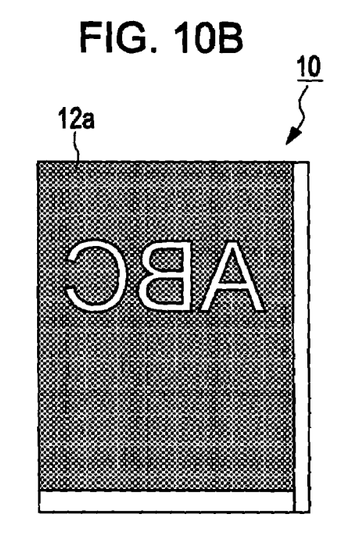

Then, the characters "ABC" displayed on the side of the front face 13a are displayed in black color as shown in FIG. 10A because the black color particles 35b of the electrophoretic particles 35, which are dispersed in the electrophoretic dispersion medium 34, gather to the side of the front face 13a. In contrast, inverted characters, which are displayed on the side of the back face 12a of the display device 10, are displayed in white color as shown in FIG. 10B because the white color particles 35w of the electrophoretic particles 35 gather to the back face 12a.

Note that, in the present embodiment, the front face 13a side or the back face 12a side, whichever correctly displays a desired image, is set as a "display side". That is, the control device 50, when the "display side" is the front face 13a side, sets the display data PD as the display data PD of one page, which are read from the image data BD. On the other hand, when the "display side" is the back face 12a side, display data PD are generated from the display data PD of one page, which are read from the image data BD, as the display data PD (inverted display data) that constitute second display data that are obtained by inverting right to left and black and white of the display data PD.

The X-axis angular signal AX that represents the inclination angle ΔX, the Y-axis angular signal AY that represents the inclination angle ΔY, and the Z-axis angular signal AZ that represents the inclination angle ΔZ are respectively input from the acceleration sensor 52 to the control device 50.

The control device 50, as it receives the Z-axis angular signal AZ from the acceleration sensor 52, determines that the front face 13a of the display panel 11 is directed upward when the Z-axis angular signal AZ is a signal that represents a range greater than or equal to "0 degrees" and less than "90 degrees". In addition, the control device 50, as it receives the Z-axis angular signal AZ from the acceleration sensor 52, determines that the back face 12a of the display panel 11 is directed upward when the Z-axis angular signal AZ is a signal that represents a range greater than or equal to "90 degrees" and less than or equal to "180 degrees". Then, the control device 50, when initial setting, after power is turned on, or the like, determines whether the front face 13a or the back face 12a is directed upward, and specifies the determined face as the "display side" that displays an image, or the like.

That is, the control device 50 detects the side of the front face 13a as the "display side" when the Z-axis angular signal AZ indicates an angle that is equal to or larger than "0 degrees" and smaller than "90 degrees", and detects the side of the back face 12a as the "display side" when the Z-axis angular signal AZ indicates an angle that is equal to or larger than "90 degrees" and equal to or smaller than "180 degrees".

Figure 11A:
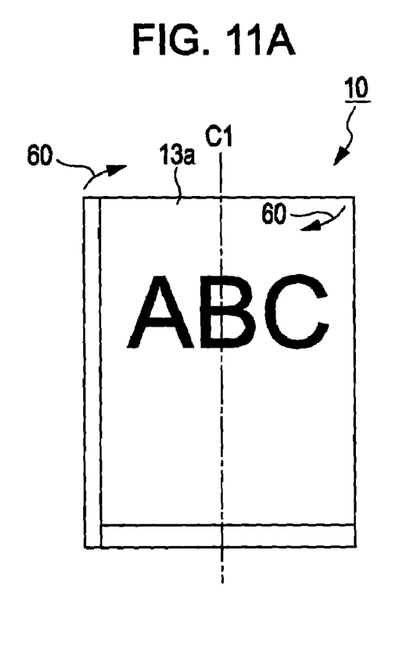
FIG. 11A is a plan view that displays a first page image on a display side (front face) and FIG. 11B is a plan view that displays a second page image on a display side (back face).
Figure 11B:
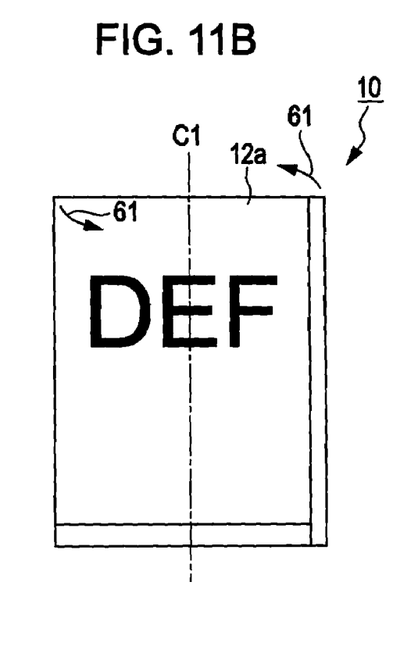

In addition, as the control device 50, as shown in FIG. 11A, detects, from the X-axis angular signal AX, that the display device 10 (including the element substrate) is rotated in a direction indicated by an arrow 60 about a center line C1 (rotation axis that is parallel to a surface of the element substrate 12), that is, rotated in a clockwise direction, the control device 50 determines that the display device 10 is rotated in forward direction. For example, the control device 50 determines the rotation that the inclination angle ΔX starts from "0 degrees" through "90 degrees" to "180 degrees" as "forward rotation" when the "display side" is on the side of the front face 13a or determines the rotation that the inclination angle ΔX starts from "180 degrees" through "−90 degrees" to "0 degrees" as "forward rotation" when the "display side" is on the side of the back face 12a. Furthermore, the control device 50, as shown in FIG. 11B, detects, from the X-axis angular signal AX, that the display device 10 is rotated in a direction indicated by an arrow 61 about the center line C1, that is, rotated in a counterclockwise direction, the control device 50 determines that the display device 10 is rotated in reverse direction. For example, the control device 50 determines the rotation that the inclination angle ΔX starts from "0 degrees" through "−90 degrees" to "180 degrees" as "reverse rotation" when the "display side" is on the side of the front face 13a or determines the rotation that the inclination angle ΔX starts from "180 degrees" through "90 degrees" to "0 degrees" as "reverse rotation" when the "display side" is on the side of the back face 12a.

Then, the control device 50, when the display device 10 is rotated in forward direction, determines that it proceeds to the next page, and changes data, which are read from the image data BD, to the next one page display data PD. In addition, the control device 50, when the display device 10 is rotated in reverse direction, determines that it returns to the preceding page, and changes data, which are read from the image data BD, to the preceding one page display data PD.

Incidentally, the control device 50, as a page displayed on the display panel 11 after the power is turned on, reads out the first page immediately after new image data BD are stored in the RAM, and, other than the above situation, selects the same page as the previous time.

The control device 50 is configured to input button signals B1 to B4, which are output on the basis of ON operations, from the operating buttons 111 to 114. The control device 50 executes functions corresponding to the button signals B1 to B4, respectively, in response to the button signals B1 to B4. In addition, applications of the button signals B1 to B4 from the operating buttons 111 to 114 are changed by data, programs, or the like, stored in the RAM or ROM. Note that, in the present embodiment, the operating button 111 is allocated to "power" button by which power is turned on or off, the operating button 112 is allocated to "preceding page" button by which it goes back to the preceding page, the operating button 113 is allocated to "next page" button by which it proceeds to the next page, and the operating button 114 is allocated to "display side switch" button by which the "display side" is switched. In addition, in addition to the above described buttons, an operating button by which positive or negative of display is switched or an operating button for adjusting the grayscale of display may be provided.

The display control circuit 22 is electrically connected to the scanning line driving circuit 23 and to the data line driving circuit 24. The display control circuit 22 outputs a vertical synchronizing signal SC to the scanning line driving circuit 23 and outputs a data timing signal VD to the data line driving circuit 24. In addition, the display control circuit 22 receives one page display data PD from the control device 50, synchronizes the display data PD with the data timing signal VD and then supplies the display data PD to the data line driving circuit 24. Then, an image, or the like, is displayed on the display panel 11.

The scanning line driving circuit 23 selects a scanning line from among the n scanning lines Ly1 to Lyn, which are provided on the element substrate 12, in order of Ly1, Ly2, . . . , Lyn−1, and Lyn on the basis of a vertical synchronizing signal SC transmitted from the display control circuit 22. Then, the scanning line driving circuit 23 outputs one of scanning signals SC1 to SCn (n is natural number) corresponding to the selected scanning line. Then, by these scanning signals SC1 to SCn, the timing at which data signals VD1 to VDm, output from the data line driving circuit 24, are supplied to the pixels 26 located on the selected scanning line is controlled.

The data line driving circuit 24 generates the data signals VD1 to VDm corresponding to the display data PD and supplies them to the respective pixels 26 through the corresponding data lines Lx1 to Lxm. That is, the organic transistors Tr of the pixels 26 selected by the scanning signals SC1 to SCn from the scanning line driving circuit 23 are set to an on state, and the data signals VD1 to VDm supplied respectively to the pixels 26 are supplied through the organic transistors Tr to the pixel electrodes 27. That is, an electric field is generated on the basis of the data signals VD1 to VDm between the pixel electrodes 27 and the common electrode 18 that face each other through the electrophoretic display layer 14. Then, on the basis of the electric field generated between the pixel electrodes 27 and the common electrode 18, the white color particles 35w and the black color particles 35b, which serve as the electrophoretic particles 35, move to any one of the pixel electrodes 27 and the common electrode 18, each having an electric potential corresponding to the respective electric charges of the white color particles 35w and the black color particles 35b. Thus, an image, or the like, that basically appears white color or black color is displayed on the surface of the display panel 11.

Next, the operation of the above constructed electrophoretic display device 10 will be described with reference to FIG. 11A and FIG. 11B. Here, for the sake of convenience of description, in the control device 50 of the display device 10, new image data BD that include images of multiple pages are stored in the RAM, and the first page image of those image data BD is a positive image that shows characters "ABC" in black on a white background, and the second page image thereof is a positive image that shows characters "DEF" in black on a white background.

First, the operating button 111 as "power" button is manipulated to turn on the power of the display device 10. Then, the control device 50 determines the side of the front face 13a of the display panel 11, which is directed upward (ceiling side), as the "display side", and displays an image showing "ABC" on the side of the front face 13a as shown in FIG. 11A.

Next, the display device 10 is rotated about the center line C1 in a direction indicated by the arrow 60. Then, the control device 50 determines that the display device 10 is rotated in forward direction on the basis of the Z-axis angular signal AZ input from the acceleration sensor 52.

When the control device 50 determines that the display device 10 is rotated in forward direction and the "display side" is switched to the side of the back face 12a, the control device 50 reads out the second page display data PD from the image data BD in order to proceed to the next page. Then, the control device 50, because the "display side" is on the side of the back face 12a, generates display data PD (inverted display data) that are obtained by inverting right to left and black and white of an image based on the second page display data PD and inputs the inverted display data PD to the display control circuit 22. Subsequently, on the side of the back face 12a that has become the "display side" of the display device 10, as shown in FIG. 11B, an image that shows characters "DEF" in black on a white background is displayed.

Thereafter, similarly, the control device 50, when the display device 10 is rotated in forward direction and the "display side" is switched to the side of the front face 13a, reads out the next page display data PD from the image data BD and then inputs the display data PD to the display control circuit 22. In addition, the control device 50, when the display device 10 is rotated in forward direction and the "display side" is switched to the side of the back face 12a, reads out the next page display data PD from the image data BD, generates display data PD (inverted display data) by inverting right to left and black and white of an image based on the display data PD and then inputs the inverted display data PD to the display control circuit 22. In this manner, it is possible to sequentially display the images of pages on the display device 10.

On the other hand, as shown in FIG. 11B, when the second page image "DEF" is displayed on the back face 12a, the display device 10 is rotated in a direction indicated by the arrow 61 about the center line C1. Then, the control device 50 detects that the display device 10 is rotated in reverse direction on the basis of the Z-axis angular signal AZ input from the acceleration sensor 52.

When the control device 50 determines that the display device 10 is rotated in reverse direction and the "display side" is switched to the side of the front face 13a, the control device 50 reads out the first page display data PD from the image data BD in order to return the page. Then, the control device 50, because the "display side" is the front face 13a, inputs the first page display data PD to the display control circuit 22. Then, on the front face 13a that has become the "display side" of the display device 10, as shown in FIG. 11A, an image that shows characters "ABC" in black on a white background is displayed.

Thereafter, similarly, the control device 50, when the display device 10 is rotated in reverse direction and the "display side" is switched to the side of the front face 13a, reads out the preceding page display data PD from the image data BD and then inputs the display data PD to the display control circuit 22. In addition, the control device 50, when the display device 10 is rotated in reverse direction and the "display side" is switched to the side of the back face 12a, reads out the preceding page display data PD from the image data BD, generates display data PD (inverted display data) by inverting right to left and black and white of the image based on the read display data PD and then inputs the inverted display data PD to the display control circuit 22. In this manner, it is possible to successively display the preceding page image of each page on the display device 10.

Thus, by rotating the display device 10 in forward direction or in reverse direction, it is possible to display an image on the "display side" of the side of the front face 13a or the side of the back face 12a of the display device 10 in such a manner that it proceeds to the next page or returns to the preceding page. As a result, it is possible to provide a method of driving a thin and low-cost electrophoretic display device that is able to display an image, or the like, on both the front and rear faces, it is also possible to provide and a thin and low-cost electrophoretic display device that is able to display an image, or the like.

As described above, according to the method of driving the electrophoretic display device and the electrophoretic display device according to the present embodiment, the following advantageous effects are obtained.

(1) In the present embodiment, the element substrate 12 and the opposite substrate 13 both are formed of an optically transparent material, and the element forming layer 16 is also formed of an optically transparent material. Thus, it is possible to view an image displayed on the electrophoretic display layer 14 not only from the side of the front face 13a of the display panel 11 but also from the side of the back face 12a that is the front face of the element substrate 12. Furthermore, because the electrophoretic display device 10 according to the present embodiment is formed so that one electrophoretic display layer 14 is held between the element substrate 12 and the opposite substrate 13, it is possible to form a thinner electrophoretic display device than the existing electrophoretic display device that requires two electrophoretic display layers on each of the front and rear display portions.

(2) In the present embodiment, the transparent substrate 17 is formed of the same material with the same thickness as the back face substrate 15, and the common electrode 18 is formed to have the same thickness as the element forming layer 16, so that the light transmittance ratio of the element substrate 12 is close to the light transmittance ratio of the opposite substrate 13. Thus, an image, or the like, that is displayed on the electrophoretic display layer 14 will be displayed under the same transmission ratio through the opposite substrate 13 from the A direction and through the element substrate 12 from the B direction. As a result, even when the same image is displayed on the side of the front face 13a as the "display side" or on the side of the back face 12a as the "display side", it is possible to display the image at the same light transmittance ratio. That is, it is possible to reduce a difference in image, such as a difference in light and dark, for example, depending on whether an image is displayed on the side of the front face 13a or on the side of the back face 12a.

(3) In the present embodiment, the image data BD, for example, correspond to data of the entire contents of a book. Thus, the display device 10 may be made in correspondence with one book.

(4) In the present embodiment, the control device 50, when the "display side" is the front face 13a of the display panel 11, generates the display data PD from display data PD selected from the image data BD. In addition, when the "display side" is the back face 12a of the display panel 11, the control device 50 generates the display data PD (inverted display data) by inverting right to left and black and white of display data PD, which are read from the image data BD. Thus, it is possible to display an image, based on the image data BD, on any of the front face 13a and the back face 12a of the display device 10.

(5) In the present embodiment, the display device 10 is provided with the acceleration sensor 52. Thus, it is possible to easily detect the inclination angle ΔX, the inclination angle ΔY and the inclination angle ΔZ of the display device 10 using the acceleration sensor 52, so that the rotated direction, or the like, of the display device 10 may be easily determined on the basis of the detection.

(6) In the present embodiment, it is detected from the acceleration sensor 52 whether the display device 10 is rotated in forward direction or in reverse direction. Thus, it is possible to proceed to the next page when the display device 10 is rotated in forward direction, and it is possible to return the page when the display device 10 is rotated in reverse direction. As a result, the display device 10 is able to change the image to be displayed by a manipulation like turning a book or a pamphlet.

(7) In the present embodiment, the operating button 112 is allocated to the button by which it goes back to the preceding page, the operating button 113 is allocated to the button by which it proceeds to the next page, and the operating button 114 is allocated to the button by which the display side is switched. Thus, it is possible to manually adjust the display in conformity to a position in which the display device 10 is viewed.

Other Embodiments

Figure 12:
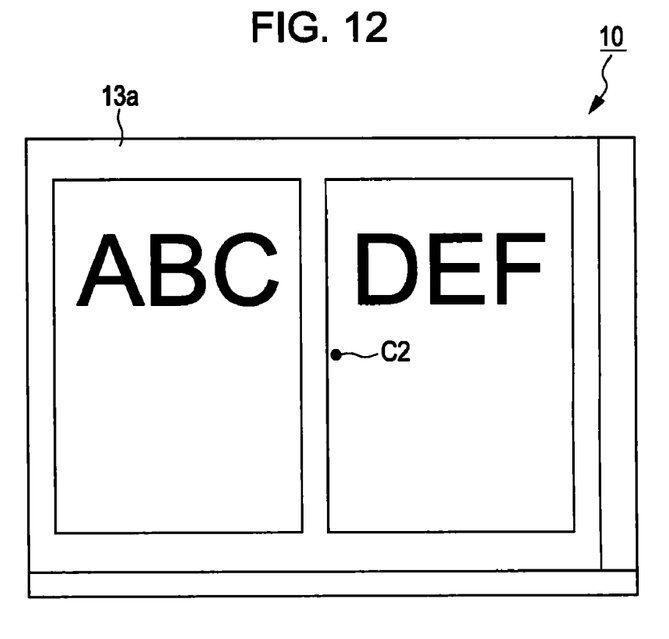
FIG. 12 is a plan view that shows an image displayed on an electrophoretic display device according to another embodiment.

In the above described embodiment, it is detected from the acceleration sensor 52 whether the display device 10 is rotated in forward direction or in reverse direction. However, it is not limited. It may be detected from the acceleration sensor 52 whether the display device 10 is rotated laterally about a point C2. For example, as shown in FIG. 12, when the display device 10 is rotated laterally by 90 degrees about the point C2, an image of two pages may be displayed by detecting that the "display side" is horizontally oriented. In addition, when it is detected that the display device 10 is rotated laterally by 180 degrees about the point C2, the displayed image may be turned upside down.

In the above embodiment, the image data BD are input from the input device 51 to the control device 50. However, it is not limited. A wireless communication function may be added to the control device 50 and then the image data BD may be transferred through wireless communication. In addition, the control device 50 may be provided with a connecting terminal of a storage device, such as a memory card, and then the image data BD may be supplied from the memory card, or the like.

In the above embodiment, the display device 10 is supplied with power from the internal storage battery; however, the display device 10 may be supplied with power from an external power supply. If so doing, it is possible to use the display device 10 irrespective of the residual capacity of electricity in the storage battery in places where there is a power supply. In addition, by separating the storage battery from the display device 10, it is possible to reduce the weight of the display device 10.

In the above embodiment, the operating buttons 111 to 114 are provided on the first frame portion 11A; however, the operating buttons 111 to 114 are not necessary. In addition, the operating buttons 111 to 114 may be replaced by an alternative. For example, a touch sensor may be provided on the front face of the display device 10, and then a contact detected by the touch sensor may be compared with an image displayed on the display device 10 to thereby detect a specific operation.

In the above embodiment, the acceleration sensor 52 is provided on the second frame portion 11B; however, the position at which the acceleration sensor 52 is provided may be any portion of the electrophoretic display device 10 as far as a position that does not hinder the display on both the front and rear faces.

In the above embodiment, the "display side" is detected by the acceleration sensor 52. However, it is not limited. The "display side" may be detected by an optical sensor or a touch sensor. When the optical sensor is used, it is possible to detect the "display side" on the basis of the detected luminosity. When the touch sensor is used, it is possible to detect the "display side" on the basis of a difference in area being held.

In the above embodiment, an image of one page is displayed on the display device 10; however, an image of multiple pages, for example, an image, or the like, of four pages may be displayed on the display device 10.

In the above embodiment, the display device 10 appears white or black in color. However, it is not limited. White or black may be another color, or may be displayed in multiple grayscales. In addition, a color filter is provided between the common electrode 18 and the transparent substrate 17 and between the element forming layer 16 and the element substrate 12, so that color display may be performed on both the front and rear faces. In this case, three pixels that respectively include red, green and blue color filters form one color pixel.

Figure 13:
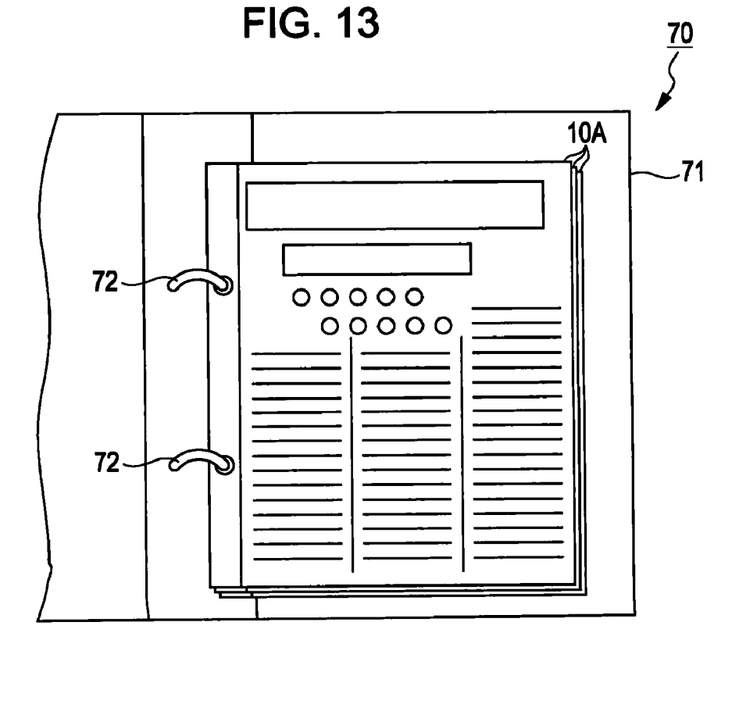
FIG. 13 is a plan view that shows the planar structure of an electronic book, which is formed of electrophoretic display devices, according to yet another embodiment.

In the above embodiment, the display device 10 is an electronic paper; however, as shown in FIG. 13, the display device 10 may be used as an electronic book 70. In this case, a plurality of electrophoretic display devices 10A are bound by rings 72 provided for a binder 71. Then, each of the electrophoretic display devices 10A may be input with the image data BD or supplied with power through the rings 72.

In the above embodiment, the first frame portion 11A and the second frame portion 11B are provided; however, both the first frame portion 11A and the second frame portion 11B need not be provided.

In the above embodiment, the back face substrate 15 and the transparent substrate 17 are formed of the same material and have the same thickness and, thereby, the element forming layer 16 and the common electrode 18 have the same thickness. However, it is not limited. The material need not be the same, and the thickness need not be the same. In short, it is only necessary that the light transmittance ratio of the element substrate 12 may be the same as the light transmittance ratio of the opposite substrate 13. In addition, when the light transmittance ratio of the element substrate 12 is different from the light transmittance ratio of the opposite substrate 13, a material, or the like, that uniforms the light transmittance ratios may be added to the side of which the light transmittance ratio is higher.

In the above embodiment, the image data BD include the display data PD for each page. However, it is not limited. The image data BD may include, for each page, third display data that use the side of the opposite substrate 13 as the "display side" and fourth display data that use the side of the element substrate 12 as the "display side".

In the above embodiment, the image data BD include the display data PD that use the side of the opposite substrate 13 as the "display side". However, it is not limited. The image data BD may include fifth display data that have a tag can specify the corresponding "display side". Then, the fifth display data may be displayed when the "display side" coincides with the tag, and sixth display data that are converted from the fifth display data may be displayed when the "display side" differs from the tag.

In the above embodiment, the display device 10 is configured so that the side of the opposite substrate 13 (front face 13a) is set as an initial display side; however, the side of the element substrate 12 (back face 12a) may be set as an initial display side.

What is claimed is:

1. An electrophoretic display device comprising:
   a transparent element substrate that has at least one transparent pixel electrode;
   a transparent opposite substrate that has a common electrode that is in correspondence with the at least one pixel electrode;
   an electrophoretic display layer that is held between the element substrate and the opposite substrate;
   a selector that selects any one of the element substrate and the opposite substrate as a display side of the electrophoretic display layer; and
   an acceleration sensor that is configured to detect rotation of the electrophoretic device, wherein the selector selects the display side of the electrophoretic display layer based on a signal from the acceleration sensor.

2. The electrophoretic display device according to claim 1, further comprising:
   a sensor that is provided to detect an upward facing surface of the electrophoretic display device, wherein the selector selects the upward facing surface as the display side on the basis of a signal from the sensor.

3. The electrophoretic display device according to claim 1, further comprising:
   a switch that is provided to specify a side on which the electrophoretic display device displays, wherein the selector selects the display side on the basis of a signal from the switch.

4. The electrophoretic display device according to claim 1, wherein the display side is configured so that the opposite substrate is selected as an initial display side.

5. The electrophoretic display device according to claim 1, wherein a plurality of sequenced pieces of display data are held, wherein
   when the display side is switched by the selector in such a manner that a surface of the element substrate is rotated in a clockwise direction about a rotation axis that is parallel to the surface of the element substrate, display data next in sequence to the display data that have been displayed before the display side is switched are displayed, and wherein
   when the display side is switched by the selector in such a manner that the surface of the element substrate is rotated in a counterclockwise direction about a rotation axis that is parallel to the surface of the element substrate, display data preceding in sequence to the display data that have been displayed before the display side is switched are displayed.

6. The electrophoretic display device according to claim 1, wherein the light transmittance ratio of the element substrate is the same as the light transmittance ratio of the opposite substrate.

7. A method of driving an electrophoretic display device that includes a transparent element substrate having at least one transparent pixel electrode, a transparent opposite substrate having a transparent common electrode that is in correspondence with the at least one pixel electrode, an electrophoretic display layer that is held between the element substrate and the opposite substrate, and a selector that selects any one of the element substrate and the opposite substrate as a display side of the electrophoretic display layer, the method comprising:
   driving display data for the electrophoretic display layer so as to obtain a display suitable for the display side that is selected by the selector;
   providing in advance third display data used when the opposite substrate is set as the display side and fourth display data used when the element substrate is set as the display side; and
   selecting any one of the third display data and the fourth display data, which are in correspondence with the display side selected by the selector, and then setting the selected display data as the display data.

8. The method of driving the electrophoretic display device according to claim 7, further comprising:
   holding first display data to be displayed on the opposite substrate in advance;
   setting the first display data as the display data when the opposite substrate is selected as the display side; and
   converting the first display data to second display data to be displayed on the element substrate and then setting the second display data as the display data, when the element substrate is selected as the display side.

9. The method of driving the electrophoretic display device according to claim 7, wherein the display data that are held in advance are fifth display data to be displayed on any one of the opposite substrate and the element substrate, wherein the fifth display data include a tag that indicates whether the fifth display data use the opposite substrate or the element substrate as a display side, the method further comprising:
   setting the fifth display data as the display data when the display side selected by the selector is a display side indicated by the tag; and
   converting the fifth display data to sixth display data to be displayed on the display side and then setting the sixth display data as the display data, when the display side selected by the selector is not a display side indicated by the tag.

10. The method of driving the electrophoretic display device according to the claim 7, further comprising:

using the same data as the display data between when the opposite substrate is set as a display side and when the element substrate is set as a display side; and changing a sequence, in which the pixel electrodes are driven, depending on the display side selected by the selector.

11. The method of driving the electrophoretic display device according to claim 7, further comprising:

holding a plurality of sequenced pieces of the display data;

driving display data next in sequence to the display data that have been displayed before the display side is switched, when the display side is switched by the selector in such a manner that a surface of the element substrate is rotated in a clockwise direction about a rotation axis that is parallel to the surface of the element substrate; and driving display data preceding in sequence to the display data that have been displayed before the display side is switched, when the display side is switched by the selector in such a manner that the surface of the element substrate is rotated in a counterclockwise direction about a rotation axis that is parallel to the surface of the element substrate.

* * * * *